(12) United States Patent
Ekholm

(10) Patent No.: US 12,138,592 B2
(45) Date of Patent: Nov. 12, 2024

(54) AIR BURST SYSTEM FOR CLEANING SUBMERGED SCREEN INTAKE

(71) Applicant: Aqseptence Group, Inc., New Brighton, MN (US)

(72) Inventor: Michael Richard Ekholm, Minneapolis, MN (US)

(73) Assignee: Johnson Screens, Inc., New Brighton, MN (US)

( * ) Notice: Subject to any disclaimer, the term of this patent is extended or adjusted under 35 U.S.C. 154(b) by 16 days.

(21) Appl. No.: 17/544,582

(22) Filed: Dec. 7, 2021

(65) Prior Publication Data
US 2022/0105474 A1    Apr. 7, 2022

Related U.S. Application Data

(63) Continuation of application No. 16/971,548, filed as application No. PCT/US2019/018728 on Feb. 20, 2019, now Pat. No. 11,192,068.
(Continued)

(51) Int. Cl.
*B01D 65/02*    (2006.01)
*B01D 29/33*    (2006.01)
(Continued)

(52) U.S. Cl.
CPC ............ *B01D 65/02* (2013.01); *B01D 29/66* (2013.01); *B01D 29/661* (2013.01); *B01D 29/33* (2013.01);
(Continued)

(58) Field of Classification Search
CPC ............ B01D 2315/06; B01D 2321/04; B01D 2321/185; B01D 29/33; B01D 29/54; B01D 29/66; B01D 29/661; B01D 33/48; B01D 65/02; C02F 1/444; C02F 2209/03; C02F 2303/14; C02F 2303/24; E03B 3/04; E03B 3/18; E02B 1/003
See application file for complete search history.

(56) References Cited

U.S. PATENT DOCUMENTS 5,062,968 A    11/1991  Warning
5,558,462 A    9/1996   O'Haver
(Continued)

FOREIGN PATENT DOCUMENTS

EP    2623176    7/2018

OTHER PUBLICATIONS

PCT International Search Report for PCT?US19/18728, mailed May 1, 2019, 2 pages.
(Continued)

*Primary Examiner* — Terry K Cecil
(74) *Attorney, Agent, or Firm* — Husch Blackwell LLP

(57) ABSTRACT

Systems and related methods for purging air burst supply piping of accumulated water prior to delivering pulses of pressurized air to an interior of a screen intake through the air burst supply piping. The systems and methods can include a purge compressor delivering a purging air supply at a head pressure slightly above a head pressure of water in the air burst supply piping, wherein the head pressure of the water is equivalent to a depth at which the intake screen. The system and methods can also include a purge line arranged in a parallel orientation to an air burst supply line, wherein both the purge line and the air burst supply line are operably coupled to a pressurized air tank.

5 Claims, 5 Drawing Sheets

Related U.S. Application Data

(60) Provisional application No. 62/633,036, filed on Feb. 20, 2018.

(51) Int. Cl.
*B01D 29/66* (2006.01)
*B01D 33/48* (2006.01)
*C02F 1/44* (2023.01)

(52) U.S. Cl.
CPC .......... *B01D 33/48* (2013.01); *B01D 2315/06* (2013.01); *B01D 2321/04* (2013.01); *C02F 1/444* (2013.01); *C02F 2209/03* (2013.01); *C02F 2303/14* (2013.01); *C02F 2303/24* (2013.01)

(56) References Cited

U.S. PATENT DOCUMENTS

| | | |
|---|---|---|
| 2003/0155314 A1 | 8/2003 | Gordon |
| 2007/0017549 A1 | 1/2007 | Ekholm et al. |
| 2011/0056526 A1 | 3/2011 | Ekholm et al. |
| 2011/0139715 A1 | 6/2011 | Zha et al. |
| 2013/0015130 A1 | 1/2013 | Breitner |
| 2015/0237014 A1 | 8/2015 | Bansal et al. |

OTHER PUBLICATIONS

PCT Written Opinion of the ISA for PCT/US19/18728, mailed May 1, 2019, 5 pages.

PCT International Preliminary Report on Patentability for PCT/US19/18728, dated Sep. 3, 2020, 7 pages.

Application and File history for U.S. Appl. No. 16/971,548, filed Aug. 20, 2020. Inventor: Michael Richard Ekholm.

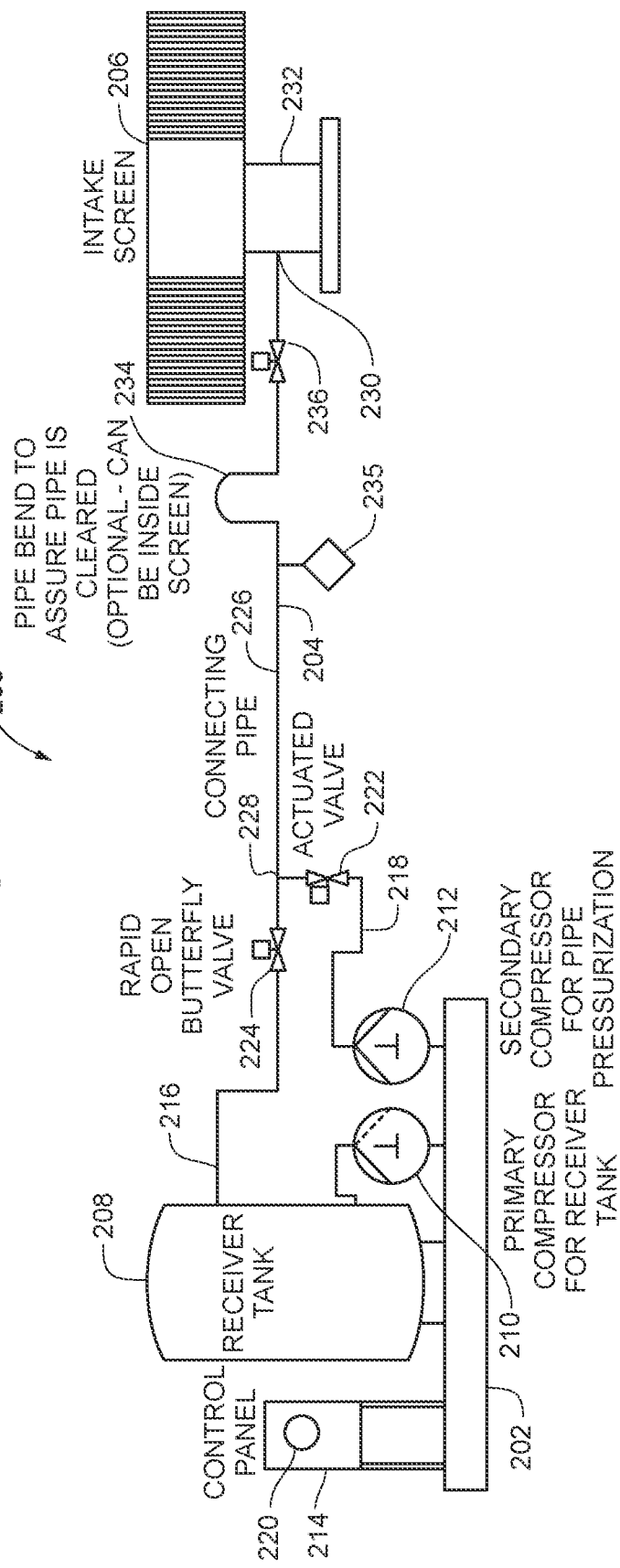

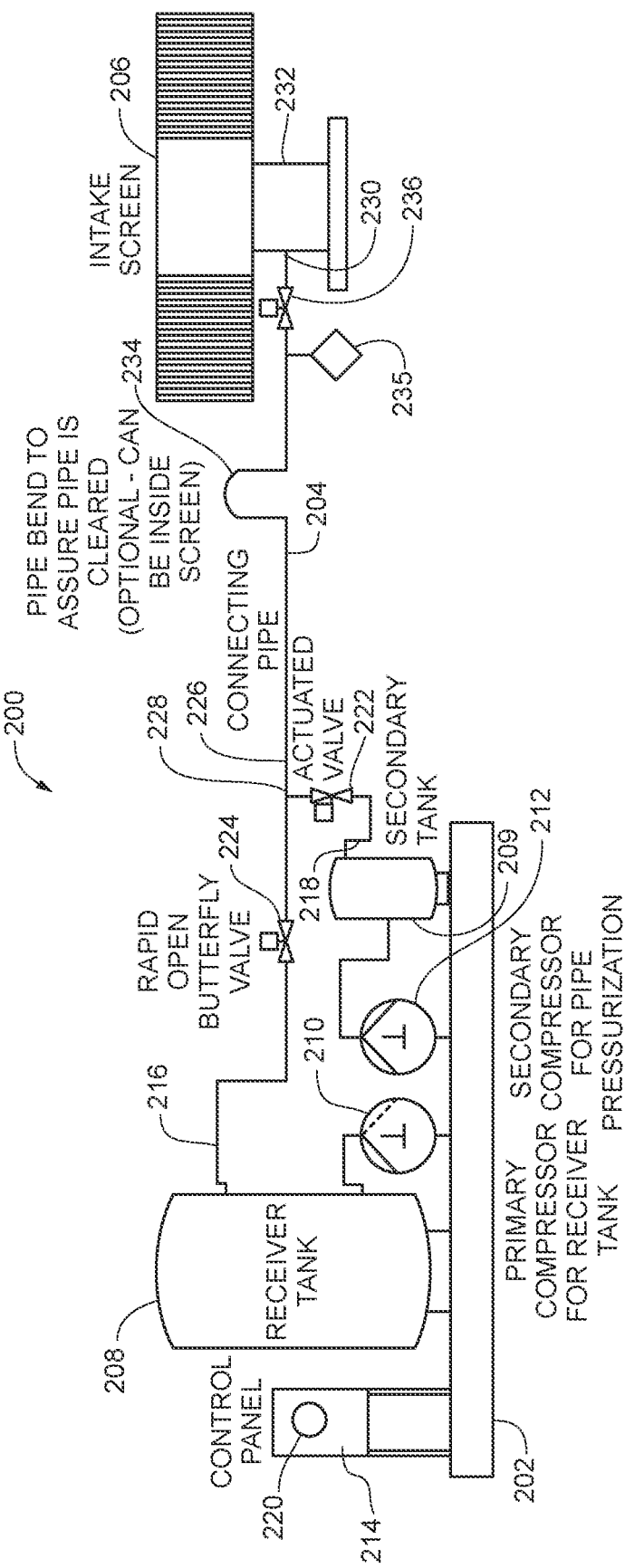

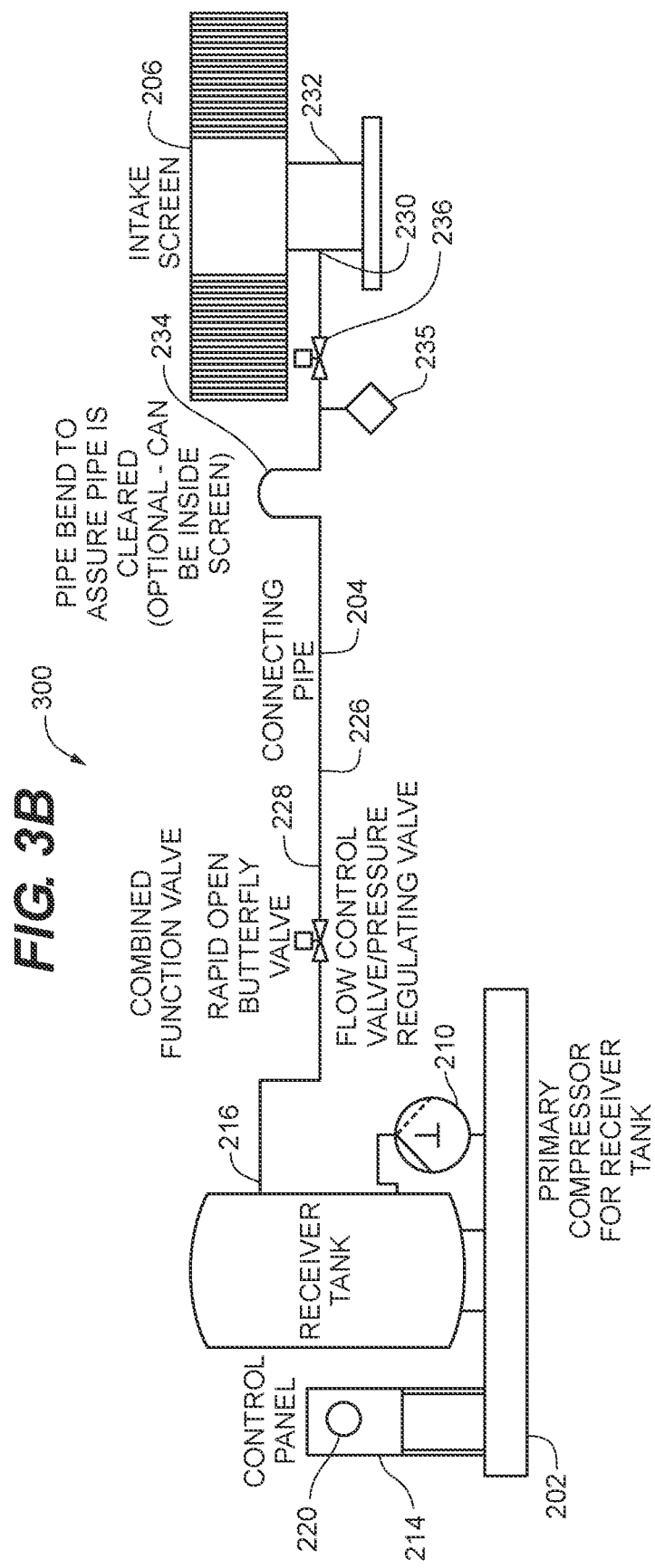

AIR BURST SYSTEM FOR CLEANING SUBMERGED SCREEN INTAKE

PRIORITY CLAIM

The present application is a continuation application of U.S. patent application Ser. No. 16/971,548 (issued as U.S. Pat. No. 11,192,068), filed on Aug. 20, 2020, which was a National Phase entry of PCT Application No. PCT/US19/18728, filed on Feb. 20, 2019, which claims priority to U.S. Provisional Application Ser. No. 62/633,036 filed Feb. 20, 2018 and entitled "AIR BURST SYSTEM FOR CLEANING SUBMERGED SCREEN INTAKE", all of which are hereby incorporated by reference in their entirety.

TECHNICAL FIELD

The present invention is directed to submerged intake filters for filtering surface water. More specifically, the present invention is directed to an air burst system for cleaning submerged intake filters.

BACKGROUND

Water collection systems are typically used to provide water to end users such as manufacturing plants, cities, irrigation systems, and power generation facilities located adjacent a body of water such as a river, lake, or salt water bodies. The end users can employ this type of system as an alternative to drilling water well or buying water from a municipality. Many of these systems are also made necessary based on the location of the end user, for example remote locations where water from a municipal source and/or electrical power to operate pumps is not readily available. These water collection systems have the ability to adapt to varying conditions and deliver water efficiently and economically.

Typically, these water collection systems use an inlet pipe adapted to transport water from a position submerged in the body of water to the end user at a location adjacent the body of water. An inlet pipe is submerged in the body of water and the end of the inlet pipe is typically coupled to an intake screen. The intake screen functions as a rough filter, for example, using such as ribs, wire mesh, or perforated screens disposed on an outer surface to prevent the introduction of large waterborne debris and/or aquatic life of a certain size, from entering the inlet pipe.

During normal operation, the intake screen can become plugged and/or blinded so as to negatively impact intake performance. For example, the intake screen can become entrained with debris such as, for example, sticks or logs ore even trash. When the intake screen is used in cold weather climates, temperatures can be low enough to form frazil ice, which can similarly coat or plug the intake screen. If the intake screen is not cleared of this debris, water flow through the intake screen can eventually be halted.

A variety of cleaning systems have been utilized to remove debris including physical scraping devices. While these scraping devices can be effective, the inherent problems associated with maintenance and repair of these submerged scraping devices can make them expensive to operate and lead to significant downtime of the inlet pipe.

An alternative design known as a Hydroburst™ system available from the Johnson Screens® division of the Aqseptence Corporation uses one or more pulses of pressurized air delivered to the interior of the intake screen to expel debris from the exterior of the intake screen. While these air burst systems are very effective, their performance can be hindered as filtering locations move further off shore and away from a supply of pressurized air. In order to have the greatest cleaning success, the submerged supply piping that provides the pressurized air to the interior of the intake screen must be cleared of water prior to pulsing the pressurized air. As the location of the intake screen moves further offshore, the total volume of water that must be cleared from the submerged supply piping continues to increase, which can limit the volume of pressurized air available for the pulses as well as increasing air pressure recharging times between pulses.

As such, it would be advantageous to improve upon current air burst systems for cleaning screen intakes such that debris removal performance can be maintained as filtering locations move further offshore and way from onshore air supplies.

SUMMARY

Representative embodiments of the present invention are directed to systems and methods for purging air burst supply piping of accumulated water prior to delivering pulses of pressurized air to an interior of a screen intake through the air burst supply piping. Generally, the present invention is directed to the removal of accumulated water in the air burst supply piping prior to delivering one or more pulses of pressurized air to the screen intake through the air burst supply piping. In one representative embodiment, the systems and methods of the present invention can include a purge compressor delivering a purging air supply at a head pressure slightly above a head pressure of water in the air burst supply piping, wherein the head pressure of the water is equivalent to a depth at which the intake screen. In another representative embodiment, the systems and methods can include a purge line arranged in a parallel orientation to an air burst supply line, wherein both the purge line and the air burst supply line are operably coupled to a pressurized air tank.

As used throughout the present application, the term "onshore" refers not only to its conventional usage of situated or occurring on land but will also refer to other locations in which screen intakes and their accompanying systems and methods are utilized. These can include both temporary and permanent installations making use of floating barges, either docked, anchored or otherwise free-floating, as well as offshore structures such as oil and natural gas rigs.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 2A is a schematic illustration of an air burst system according to the present invention.

FIG. 2B is a schematic illustration of an alternative embodiment of the air burst system of FIG. 2A according to the present invention.

FIG. 3B is a schematic illustration of an alternative embodiment of the air burst system of FIG. 3A according to the present invention.

Figure 1A:
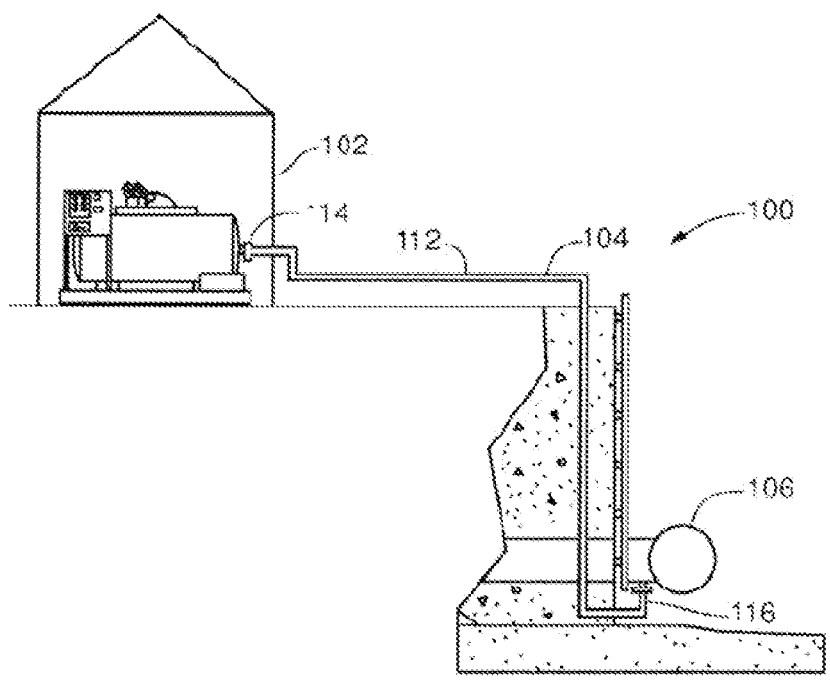
FIG. 1A is a schematic illustration of a conventional air burst system according to the prior art.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1B:
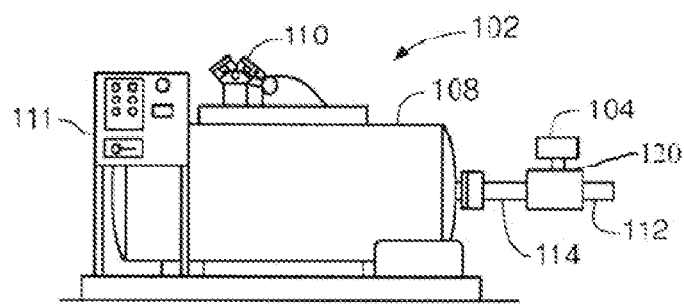
FIG. 1B is a side view of an onshore air system according to the prior art.
Figure 1C:
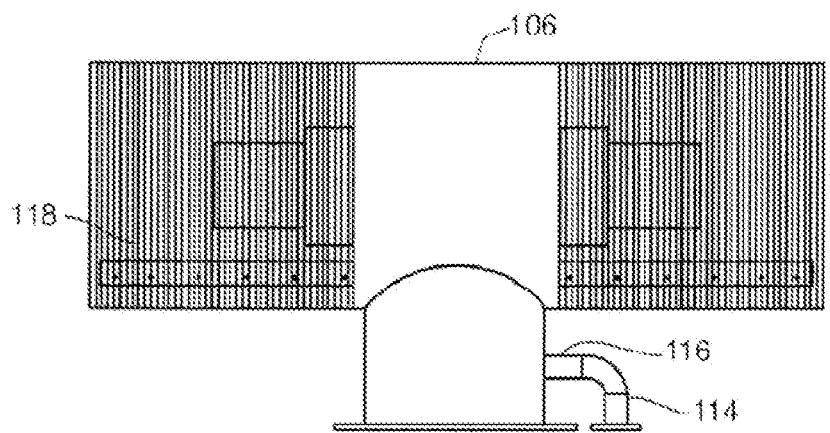
FIG. 1C is a front view of a submerged screen intake according to the prior art.

As shown in FIGS. 1A, 1B and 1C, a conventional air burst system 100 according to the prior art generally includes an onshore air system 102, a distributor system 104 and a submerged screen intake 106. Typically, onshore air system 102 will include a receiver tank 108 for storing compressed air and a burst compressor 110 that charges/fills the receiver tank 108 with the compressed air. Generally, the burst compressor 110 and receiver tank 108 are selected such that the compressed air within the receiver tank 108 is pressurized to within the range of 165-200 PSIA. Onshore air system 102 can also include a control panel 111 that allows an onshore operator to set a burst frequency for the onshore air system 102. The control panel 111 can include necessary components for setting the burst frequency including, for example, a digital or mechanical timer, a microprocessor based controller, a programmable logic controller or similar control element and can include an input device such as for example, a keyboard, mouse, display, touch screen display and the like. Distributor system 104 generally comprises a length of air supply piping 112 having an onshore end 114 that is operably connected to the receiver tank 108 and an offshore end 116 that operably connected to an airburst manifold 118 that is located within the submerged screen intake 106.

Typically, an operator will specify a burst frequency of the onshore air system 102 using the control panel 111. The burst frequency can vary based on factor including, for example, the water quality in which the submerged screen intake 106 resides, the amount of solid contaminants, particles and objects within the water and time of year, for example summer versus winter when frazil ice may be present. Generally, the control panel 111 opens a supply valve 120 that releases pressurized air from the receiver tank 108 into the air supply piping 112. Due to the submerged location of the air supply piping 112, the pressurized air must push any accumulated water out of the air supply piping 112 prior to releasing a pressurized burst through the airburst manifold 118. As such, the receiver tank 108 must be sized not only to provide the necessary pressurized burst but also to force any accumulated water from the air supply piping 112. This increases the required size and volume of the receiver tank 108, which will consequently increase costs for the air burst system 100 and possible make the air burst system 100 impractical for use in remote locations.

Referring now to FIG. 2A, an improved air burst system 200 according to an embodiment of the present invention is illustrated. Generally, air burst system 200 can comprise an onshore air system 202, a distributor system 204 and a submerged screen intake 206.

Onshore air system 202 generally comprises a receiver tank 208, a primary compressor 210, a secondary compressor 212 and a control panel 214. Primary compressor 210 generally compresses air and fills receiver tank 208 for use in providing a pressurized burst of air to the distributor system 204 through a burst line 216. Secondary compressor 212 can be connected directly to the distributor system 204 through a purge line 218. Generally, the primary compressor 210 and receiver tank 208 are selected such that the compressed air within the receiver tank 208 is pressurized to within the range of 165-200 PSIA. The secondary compressor 212 is generally sized for the removal of accumulated water from the distributor system 204 and will be dependent upon the depth at which the distributor system 204 and submerged screen intake 206 are submerged. For example, the second compressor 212 can be sized so as to provide compressed air at greater than 30-40 feet of head pressure. Onshore air system 202 can also include a controller 220 in the control panel 214 that allows an onshore operator to set a burst frequency for the onshore air system 202. The controller 220 can include necessary components for setting the burst frequency including, for example, a digital or mechanical timer, a microprocessor based controller, a programmable logic controller or similar control element and can include an input device such as for example, a keyboard, mouse, display, touch screen display and the like. Controller 220 will selectively open and close a purge valve 222 and a burst valve 224, located within the purge line 218 and burst line 216 respectively, so as to selectively provide purge air or burst air to the distributor system 204.

Distributor system 204 generally comprises a length of air supply piping 226. The air supply piping 226 generally includes an onshore end 228 that is fluidly coupled to both the burst line 216 and the purge line 218. The air supply piping 226 further comprises an offshore end 230 that is operably coupled to an airburst manifold 232 that is located within the submerged screen intake 206. The air supply piping 226 can further comprise a supply bend 234 located between the onshore end 228 and the offshore end 230 to help ensure that the air supply piping 226 is cleared of water prior to supplying burst air to the airburst manifold 232. Air supply piping 226 can further comprise a pressure senor 235 proximate the offshore end 230, wherein the pressure sensor 235 can supply pressure data to the control panel 220 indicating when a pressure reading in the air supply piping 226 is equal to the pressure of the purging air supplied by the second compressor 212 such that confirmation is provided that any water in the air supply piping 226 has been removed and the air burst can be provided from the receiver tank 208. In some embodiments, air supply piping 226 can further comprise a screen valve 236 located in proximity to the offshore end 230, wherein the screen valve 236 can be selectively opened and closed at the direction of the control panel 220. Screen valve 236 can allow air supply piping 226 to be fully pressurized throughout its length, for example, between the onshore air system 202 and the offshore end 230. As illustrated, screen valve 236 can be external to the submerged screen intake 206 or alternatively, screen valve 236 can be in proximity to the airburst manifold 232 that is located within the submerged screen intake 206.

In operation, an operator will specify a burst frequency of the onshore air system 202 using the control panel 220. The burst frequency will vary based on the factors previously discussed with respect to air burst system 110 and can include, for example, water quality including the presence of solid contaminants, particles and objects within the water and time of year, for example summer versus winter when frazil ice may be present. In contrast to the prior art, the air burst system 200 of the present invention undergoes a purge cycle prior to providing pressurized air from the receiver tank 208.

During the purge cycle, the control panel 220 causes the purge valve 222 to be opened such that the secondary compressor 212 can supply purge air through the purge line 218 and into the air supply piping 226. As mentioned previously, the pressure at which the secondary compressor 212 operates is dependent upon the submerged depth of the air supply piping 226 and the submerged screen intake 206. For example, the head pressure of the purge air will typically be greater than 30-40 feet of head and in all cases should exceed the submerged depth of the air supply piping 226 and the submerged screen intake 206, any accumulated water within the air supply piping 226 and submerged screen intake 206 is expelled through the airburst manifold 232 such little to no water remains within the air supply piping 226 and the submerged screen intake 206. With the water evacuated from the air supply piping 226 and the submerged screen intake 206, the pressure sensor 234 transmits a signal to the control panel 220 indicating that the pressure within the air supply piping 226 exceeds the depth pressure so as to provide the control panel 220 with confirmation that the purge cycle has been completed. Either prior to or during the purge cycle, primary compressor 210 can be operating independently as directed by the control panel 220 to fill the receiver tank 208 with pressurized air at a desired air burst pressure. In the event that the air supply piping 226 includes the screen valve 236, screen valve 236 can be closed following completion of the purge cycle to maintain the pressurized purge air within the air supply piping 226 until an air burst is requested.

Following the completion of the purge cycle, the control panel 220 closes the purge valve 222 and causes the burst valve 224 to open. With the burst valve 224 open, burst air from the receiver tank 208 is supplied into now evacuated distributor system 204. The burst air supplied from receiver tank 208 is provided at a pressure of 165-200 PSIA. As no water is present within the air supply piping 226 and the submerged screen intake 206, the volume of burst air necessary to achieve a pressurized burst through the airburst manifold 232 is significantly reduced as compared to the prior art and may constitute less than half of the air volume necessary with the prior art. As such, the capacity of both receiver tank 208 and primary compressor 210 can both be significantly reduced in comparison to conventional designs resulting in significant savings and making the air burst system 200 practical in some remote locations that otherwise may be impractical. For example, the design capacity of receiver tank 208 can shrink by 50% or more, for example, from about 12,000 gallons to about 6,000 gallons or less leading to significant savings in both construction and transportation. In addition, the reduced size of the primary compressor 210 as compared to conventional designs can allow for the air burst system 200 to utilize solar power making the air burst system 200 even more advantageous for remote locations. Furthermore, the evacuation of water from the distributor system 204 during the purge cycle can allow for the offshore distance of the submerged screen intake 206 to be increased, for example, from a current maximum of about 1,500 feet offshore to an extended distance of 2-3 km offshore. Finally, the purge cycle allows for the diameter of the air supply piping 226 to be decreased which can lead to significant cost savings, especially when the submerged screen intake 206 is located a significant distance offshore.

Referring now to FIG. 2B, an alternative embodiment of air burst system 200 can include the addition of a secondary tank 209 that is filled by the secondary compressor 212 and which is directly connected to the purge line 218. Operation is otherwise similar to air burst system 200 but with the exception that the purge air comes from the secondary tank 209 as opposed to directly from the secondary compressor 212. This can allow the secondary compressor 212 to be reduced in size/capacity as the secondary compressor 212 can fill the secondary tank 209 over an extended time as opposed to being sized to purge all of the air supply piping 226 directly. In addition, secondary tank 209 is not required to be fabricated to withstand the high pressures of the receiver tank 208 and the corresponding air burst pressures such that the costs of fabricating the secondary tank 209 can be reduced.

Figure 3A:
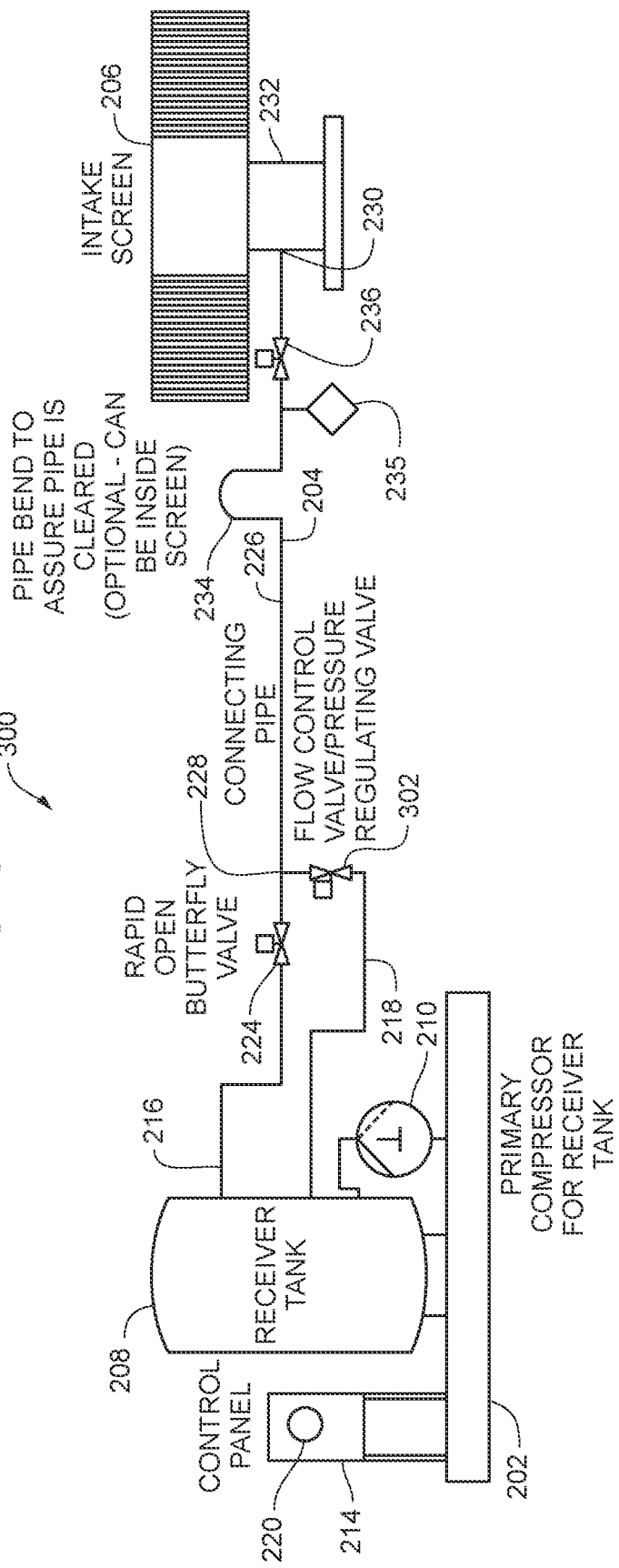
FIG. 3A is a schematic illustration of an alternative embodiment of an air burst system according to the present invention.

Referring now to FIG. 3A, an alternative embodiment of an air burst system 300 can similarly make use of a purge cycle prior to providing pressurized air to the submerged screen intake 206. The performance and advantages of air burst system 300 can be substantially the same as air burst system 200 but using a different configuration. In air burst system 300, secondary compressor 212 is essentially by directly connecting the purge line 218 to a pressure regulating valve 302 that is fluidly connected to the receiver tank 208. As directed by the control panel 220, the pressure regulating valve 302 bleeds the high pressure air contained within the receiver tank 208 to the desired purge pressure where it is directed into the distributor system 204. As such, pressure regulating valve 302 can further perform the function of purge valve 222. Following the purge cycle, the control panel 220 closes the pressure regulating valve 302, whereby the burst valve 224 is opened and the burst air is provided from the receiver tank 208 in a manner similar to that as described with respect to air burst system 200.

With respect to air burst system 200 and air burst system 300 as previously discussed, a means for purging a distributor system will generally comprise the components described relative to the purge line 218. For example, the means for purging a distributor system relative to air burst system 200 will generally comprise the secondary compressor 212, the purge line 218, the purge valve 222 and the operational control provided by the control panel 220. Relative to air burst system 300, the means for purging the distributor system can comprise the receiver tank 208, the purge line 218, the purge valve 222, the pressure regulating valve 302 and the operational control provided by the control panel 220.

In another variation of air burst system 300 as shown in FIG. 3B, purge line 218 can be completely removed and pressure regulating valve 302 can be positioned within the burst line 216 such that both the purge and air burst functions are accomplished through purge line 218. In this way, capital and installation costs can be reduced in that there is no necessity for any of the components of purge line 218.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An air burst system for cleaning submerged screen intakes, comprising:
    an onshore air system comprising a receiver tank, a primary compressor and a secondary compressor;
    a submerged screen intake; and
    a length of air supply piping fluidly connecting the onshore air system and the submerged screen intake,
    wherein the length of air supply piping further comprises (i) an offshore end that is operably coupled to an airburst manifold that is located within the submerged screen intake and (ii) a pressure sensor proximate the offshore end;
    wherein the onshore air system includes a burst line, a burst valve in the burst line, a purge line fluidly connected to the submerged screen intake, a purge valve in the purge line, and a controller, the secondary compressor fluidly connected to said purge line and supplying purge air to the length of air supply piping for purging water from the length of air supply piping between the onshore air system and the submerged screen intake through the airburst manifold, and said primary compressor filling the receiver tank with pressurized air, said receiver tank connected to said burst line for supplying one or more pulses of pressurized air to the length of air supply piping for cleaning debris from the submerged screen intake, and
    wherein the controller is configured to (a) open the purge valve to begin a purge cycle supplying the purge air to the length of air supply piping, (b) receive a pressure signal from the pressure sensor indicating the purge cycle is complete and little or no water remains in the length of air supply piping, (c) close the purge valve after the purge cycle is complete, and (d) open the burst valve to begin supplying the one or more pulses of pressurized air.

2. The air burst system of claim 1, wherein the purge line is fluidly connected to the receiver tank, and wherein the purge valve is configured as a pressure regulating valve for reducing a pressure of the pressurized air to a burst air pressure.

3. The air burst system of claim 1, wherein the controller of the onshore air system includes a control panel.

4. The air burst system of claim 1, wherein the purge air has a purge air pressure of at least 30 feet of head pressure and wherein the one or more pulses of pressurized air are within the range of 165-200 PSIA.

5. The air burst system of claim 1, wherein the length of air supply piping further comprises a screen valve operably mounted in proximity to the submerged screen intake, the screen valve allowing purge air to be retained within the length of air supply piping prior to the introduction of the one or more pulses of pressurized air.

* * * * *